US012389174B2

(12) United States Patent
Sreepadarao et al.

(10) Patent No.: US 12,389,174 B2
(45) **Date of Patent: *Aug. 12, 2025**

(54) HEARING AID COMPRISING A USER INTERFACE

(71) Applicant: Oticon A/S, Smørum (DK)

(72) Inventors: Sudershan Yalgalwadi Sreepadarao, Smørum (DK); Anders Meng, Smørum (DK); Meng Guo, Smørum (DK); Mojtaba Farmani, Smørum (DK); Martin Kuriger, Fribourg (CH); Mikkel Grønbech, Smørum (DK); Nels Hede Rohde, Smørum (DK); Thomas Jensen, Smørum (DK)

(73) Assignee: Oticon A/S, Smørum (DK)

( * ) Notice: Subject to any disclaimer, the term of this patent is extended or adjusted under 35 U.S.C. 154(b) by 205 days.

This patent is subject to a terminal disclaimer.

(21) Appl. No.: 17/903,696

(22) Filed: Sep. 6, 2022

(65) Prior Publication Data

US 2023/0074554 A1 Mar. 9, 2023

(30) Foreign Application Priority Data

Sep. 6, 2021 (EP) .................................... 21195040

(51) Int. Cl.
*H04R 25/00* (2006.01)

(52) U.S. Cl.
CPC ........... *H04R 25/554* (2013.01); *H04R 25/70* (2013.01); *H04R 2225/43* (2013.01)

(58) Field of Classification Search
CPC ................ H04R 25/70; H04R 2225/43; H04R 2225/021; H04R 25/554
USPC .......................................................... 381/315
See application file for complete search history.

(56) References Cited

U.S. PATENT DOCUMENTS 10,966,038 B2 * 3/2021 Callaway ............. H04R 25/453
2013/0259247 A1 10/2013 Kim
2017/0078804 A1 3/2017 Guo et al.
2019/0253817 A1 * 8/2019 Callaway ............. H04R 25/558
(Continued)

FOREIGN PATENT DOCUMENTS

WO WO 2010/019660 A2 2/2010
WO WO 2010/019660 A3 2/2010

OTHER PUBLICATIONS

The extended European Search Report issued in Application No. 21195040.7, dated Feb. 23, 2022.
(Continued)

*Primary Examiner* — Phylesha Dabney
(74) *Attorney, Agent, or Firm* — Birch, Stewart, Kolasch & Birch, LLP

(57) ABSTRACT

A hearing aid configured to be worn by a user, the hearing aid comprising a user interface allowing the user to control functionality of the hearing aid, and a feedback sensor for repeatedly providing a feedback signal indicative of a current estimate of feedback from an output transducer to an input transducer of the hearing aid, wherein the user interface is based on changes to the current estimate of the feedback path, e.g. provided by the user. A method of operating a hearing aid is further disclosed. Thereby an alternative user interface for a hearing aid may be provided. The invention may e.g. be used in hearing aids or headsets, or a combination thereof.

20 Claims, 3 Drawing Sheets

(56) References Cited

U.S. PATENT DOCUMENTS

| | | | |
|---|---|---|---|
| 2019/0268712 | A1 | 8/2019 | Martin et al. |
| 2020/0314521 | A1 | 10/2020 | El Guindi et al. |

OTHER PUBLICATIONS

Extended European Search Report for European Application No. 22193881.4, dated Jan. 18, 2023.

* cited by examiner

HEARING AID COMPRISING A USER INTERFACE

TECHNICAL FIELD

The present application relates to the field of hearing aids, in particular to a user interface for a hearing aid.

The use of a smartphone or other portable electronic device comprising a convenient user interface is standard in state-of-the-art hearing aid systems. A user interface for a hearing aid or hearing aid system may e.g. be implemented as an APP executed on the portable electronic device, e.g. using a touch screen for visual and tactile interaction between the user and the hearing aid or hearing aid system.

A user interface of the mentioned kind is convenient in many situations where the portable electronic device is anyway at hand, e.g. being used for other purposes.

In some cases, however, the portable electronic device comprising the user interface is not immediately accessible to the user of the hearing aid(s) (e.g. located in a bag or pocket, or not carried), or the user does for other reasons not wish to use it.

SUMMARY

The present disclosure presents an alternative user interface for interacting (e.g. controlling) a hearing aid or hearing aid system, e.g. a binaural hearing aid system).

One situation, where the alternative user interface may be useful, is where the user does not have access to the normally used (e.g. APP-based) user interface.

A specific situation where the alternative user interface may be useful (even if the user does have access to the normally used user interface) is in a communication situation (e.g. a telephone mode), where a 2-way audio feature of the hearing aid or hearing aid system is activated to enable the hearing aid(s) to be used as a headset. In a telephone mode of operation, the hearing aid or hearing aid system is connected to the user's mobile telephone (e.g. via Bluetooth), e.g. so that the user's voice is picked up by microphones of the hearing aid(s) and transmitted to the mobile telephone, while voice from a far-end user is received from the mobile telephone and presented to the user via the loudspeaker(s) of the hearing aid(s).

In current hearing aid solutions, the decisions of a telephone call (e.g. answering/hanging up/rejecting) are managed via a normal user interface, e.g. by pressing 'buttons' on a mobile phone screen. In normal daily life, the hearing aid user is forced to physically pick up the telephone to perform these call management actions several times a day, which may be perceived as cumbersome and does not provide a fully 'handsfree experience'.

The solution described in the present disclosure makes use of existing dynamic feedback sensor technology in state-of-the-art hearing aids. An exemplary application of the solution may be to enable a truly handsfree experience during telephone call.

More specifically, when a user interaction/hand gesture is expected (which then triggers a change in the hearing aids(s), e.g., in connection with an incoming phone call), the hearing aid may be configured to enter a special command mode, e.g. a "call ready" mode, wherein a gain reduction is applied to a signal of the audio path of the hearing aid (e.g. by a predefined amount, such as ≥3 dB), while hand gestures, inducing predefined feedback path changes, are expected (e.g. for a predefined time, e.g. between 10 s and 60 s). Thereby (annoying) severe feedback whistling while hand gestures are generated by the user may be avoided. By reducing gain while in the "call ready" mode (or in more general terms, a "command" or "await hand gesture" mode), a user experience of the hand gesture feature without feedback howl can be provided. An exemplary implementation of the feature is illustrated in FIG. 2.

A Hearing Aid:

In an aspect of the present application, a hearing aid configured to be worn by a user is provided. The hearing aid comprises a (gesture-based) user interface allowing the user to control functionality of the hearing aid, and a feedback sensor for repeatedly providing a feedback signal indicative of a current estimate of feedback from an output transducer to an input transducer of the hearing aid. The user interface may be based on changes to the current estimate of the feedback path (e.g. provided by the user).

Thereby an alternative user interface for a hearing aid may be provided. In the following, the terms 'alternative user interface' or 'gesture-based user interface' or 'user interface according to the present disclosure' are used interchangeably, without any intended difference in interpretation.

Instead of (or as an alternative to) 'the feedback sensor being configured to repeatedly providing a feedback signal indicative of a current estimate of feedback from an output transducer to an input transducer of the hearing aid', 'the feedback sensor may be configured to repeatedly provide a feedback signal indicative of a current feedback situation from an output transducer to an input transducer of the hearing aid'. In the latter case, the user interface may be based on changes to the current estimate of the feedback situation provided by the user. The feedback sensor may in the latter case comprise an open loop gain estimator for providing said feedback signal. The feedback signal may be an estimate of the open loop transfer function (or a part thereof, e.g. a filtered version thereof).

The hearing aid may comprise a forward path comprising
- an input transducer for picking up sound from an environment around the user when wearing the hearing aid and providing an electric input signal representing said environment sound;
- a processor for processing said electric input signal and providing a processed output signal; and
- an output transducer for converting said processed output signal to stimuli perceivable by the user as sound.

The processor may comprise a control unit configured to enter a command mode when a specific trigger signal is received. The control unit may be configured to detect one of a number of predefined changes to the feedback signal when the command mode is entered. Each of the number of predefined changes to the feedback signal may be associated with a specific command for controlling the hearing aid.

Each command may be configured to control (different) functionality of the hearing aid. The command mode may e.g. be a telephone mode. The telephone mode may be the only command mode. A specific trigger signal may be a signal from a communication device (e.g. a telephone) indicating the presence of a telephone call, or any other input from such device, or other electronic device, requiring some sort of reaction (e.g. acceptance or rejection) from the user.

When (or if) one of the number of predefined changes of the feedback signal is detected during the command mode, the processor may be configured to execute the associated command, e.g. 'accept a call', 'reject a call', 'terminate a call', etc. To execute the command, the processor needs to control an incoming and outgoing signal path (see e.g. FIG. 1, incoming path: 'From phone' via receiver (Rx) to loudspeaker (SP), and outgoing path: from microphones (M1, M2) via own-voice estimation path (OV-BF, OVP) to transmitter (Tx) 'To phone'). In case none of the predefined changes of the feedback signal is detected during the command mode (e.g. within a predefined time, e.g. less than 20 s), the processor may be configured to issue an information message to the user, e.g. via the output transducer of the hearing device, e.g. a spoken message indicating that no user input has been received regarding the trigger signal, e.g. 'incoming call has neither been accepted nor rejected, please respond'.

In case none of the number of the predefined changes of the feedback signal is detected for a predefined time period (e.g. 20 s or less, such as 10 s or less, or 5 s or less), the command mode may be terminated (and the hearing aid returned to a normal (non-command-) mode of operation).

The control unit may be configured to reduce the amplification when the command mode is entered. The aim of the gain reduction (when in the command mode) is to avoid that any possible user gesture would result in (critical) acoustic feedback (e.g. howl) occurring.

The control unit may be configured to reduce the amplification by a predefined amount or factor. The control unit may be configured to reduce its amplification of a signal of an audio path (from input transducer to output transducer) of the hearing aid by 3 dB or more, such as by 6 dB or more. The control unit may be configured to reduce the amplification by a predefined amount or factor in dependence of the trigger signal. The control unit may be configured to reduce its amplification of a signal of an audio path by different amounts or factors depending on the trigger signal.

The hearing aid may comprise a feedback sensor comprising an adaptive filter for providing said feedback signal. The adaptive filter comprises a variable filter and an adaptive algorithm. The adaptive algorithm is configured to adaptively determine updates to filter coefficients of the variable filter that minimizes an error signal in view a reference signal. The output of the variable filter may be representative of a feedback signal from the output transducer to the input transducer, when the input to the variable signal is the reference signal. The reference signal may be the processed output signal. The feedback signal may be equal to the output of the variable filter. The error signal may be equal to a difference between the electric input signal and the output of the variable filter. The feedback signal may be equal to a processed version of the output of the variable filter (e.g. a down-sampled, or filtered version, e.g. a band-pass or high-pass filtered version).

The processor may comprise a control unit for detecting one of a number of predefined changes to the feedback signal.

The hearing aid may comprise memory wherein said number of predefined changes to the feedback signal are stored. Alternatively, a number of predefined feedback signals may be stored in memory.

The hearing aid may be configured to provide that each of the predefined changes to the feedback signal is associated with a specific command for controlling the hearing aid. Alternatively, a number of predefined feedback signals may be associated with a specific command for controlling the hearing aid.

The hearing aid may be configured to execute the command associated with a detected change to the feedback signal (e.g. due to a user gesture).

The feedback signal may be based on a frequency response of the estimated feedback path from the output transducer to the input transducer.

The control unit may be configured to monitor the frequency response of the estimated feedback path in a limited frequency range. The limited frequency range may e.g. be the frequency range between 2 kHz and 8 kHz. The limited frequency range may e.g. be the frequency range between 2 kHz and 5 kHz.

The control unit is configured to reduce its amplification in certain frequency regions, e.g. in one or more of said monitored frequency ranges. The control unit may be configured to reduce its amplification in a frequency range, where feedback is most likely to occur. The control unit may be configured to reduce its amplification in a frequency range between 2 and 5 kHz.

The magnitude of the predefined changes may be configured to be above a threshold. The magnitude threshold may e.g. be in the range from 2 dB to 6 dB, e.g. around 3 dB. A comparison of the change to the current estimate of the feedback path with the number of predefined changes to the feedback signal may be required to persist for a minimum time period, e.g. from 0.2 s to 1 s. A 'short duration gesture' may e.g. be a change of approximately 3 dB, with a duration of approximately 0.2 s to 1 s. A 'long duration gesture' may e.g. be a change of approximately 3 dB, with a duration of approximately 2 s. A 'very long duration gesture' may e.g. be a change of approximately 3 dB, with a duration of approximately 5 s (or more).

A criterion for detecting one of the number of predefined changes to the feedback signal (associated with a command and a specific gesture) may be a combination of the magnitude of the (current) change (compared to just before activating the gesture-based user interface) being larger than a threshold value for a minimum time period. If, e.g., the magnitude of the current change exceeds a certain value within a time window, e.g., by 3 dB over a 0.2 to 1 second period, a predefined (e.g. 'short-duration') gesture may be identified (if not, the current change may not qualify as a gesture accepted by the user interface).

A comparison of the current feedback change with the number of predefined changes to the feedback signal may e.g. be performed by comparing the magnitude of the two signals over frequency. The criterion of a match between the current change and a specific one of the predefined changes to the feedback signal may be dependent on a difference between the current change and the different (predefined) changes being smaller than a maximum threshold value, e.g. 1-2 dB, at a number frequencies (e.g. all) over the frequency range considered (e.g. 100 Hz to 8 kHz or 2 kHz to 5 kHz) and optionally of a predefined duration (e.g. between 0.2 and 8 s).

The detection of a specific one of a number of predefined changes to the feedback signal (and thus a predefined command) may e.g. be, either 1). Based on the difference between the recent feedback estimate (stored in memory (just) before the user gestures) and the current feedback estimate (based on the user gesture); if the current feedback estimate is within a predefined range (e.g. more than 3 dB, or typically in the range of 2-6 dB) in a specific frequency range (e.g. 2-5 kHz), and e.g. for a predefined duration), a specific feedback change may be detected (and the associated command detected and/or executed); or 2). Based on a comparison of a predefined (level of the) feedback signal (stored in memory) (when the predefined gesture is performed) and the current feedback signal (based on the user gesture); if the current feedback estimate is getting close and less than 1-2 dB within the predefined level (e.g. over a given frequency range and for a given duration), a specific feedback change may be detected (and the associated command detected and/or executed).

The control unit may be configured to enter a command mode when a specific trigger signal is received. The trigger signal may be (related to) the reception of a telephone call.

The hearing aid may be constituted by or comprise an air-conduction type hearing aid or a bone-conduction type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment, e.g. a telephone mode. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

Use of a hearing aid according to the present disclosure as a user interface to a telephone may be provided.

A Method:

In an aspect, a method of operating a hearing aid configured to be worn by a user is furthermore provided by the present application. The hearing aid comprises a (gesture-based) user interface allowing the user to control functionality of the hearing aid. The method comprises repeatedly providing a feedback signal indicative of a current estimate of feedback from an output transducer to an input transducer of the hearing aid. The method may further comprise providing the user interface based on changes to the current estimate of the feedback path (e.g. provided by the user).

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The method may comprise that the changes to the current estimate of the feedback path is provided by the user, e.g. as user gestures. The user gestures may e.g. include the user bringing his or her hand (or an object comprising a reflecting surface) in proximity of the hearing aid when mounted at an ear of the user. Thereby a change to the feedback path(s) from the output transducer to the at least one input transducer of the hearing aid is evoked. The user gestures, e.g. hand gestures, e.g. including an object, may e.g. include gestures of long/short durations, gestures at left/right hearing aids (that may be synchronized, e.g. required to be present at both ears to provide a valid gesture), changing ear to hand/object distances, different repetitions of partial gestures (e.g. making the same partial gesture (move hand to within 10 cm of ear stay 1 s., remove hand from ear, repeat one or more times), etc.

The method may comprise:

entering a command mode when a specific trigger signal is received, and detecting one of a number of predefined changes to the feedback signal when said command mode is entered, and wherein each of said number of predefined changes to the feedback signal is associated with a specific command for controlling the hearing aid.

The method may comprise that the specific trigger signal is a signal from a communication device indicating the presence of a telephone call, or any other input from such device, or other electronic device, requiring some sort of acceptance or rejection from the user.

The method may comprise: providing a reduction of the amplification of a signal of an audio path from the input transducer to the output transducer, when the command mode is entered.

The method may comprise: providing the reduction of amplification by a predefined amount or factor. The method may comprise: providing the reduction of amplification by 3 dB or more, such as by 6 dB or more.

The method may comprise: providing the reduction of amplification in one or more frequency regions, where feedback is most likely to occur. The method may comprise: providing the reduction of amplification in a frequency range between 2 kHz and 5 kHz.

The method may comprise terminating the command mode in case no hand gesture has been detected within a predefined time. When none of the number of the predefined changes of the feedback signal is detected for a predefined time period, the command mode may terminated (and the hearing aid is returned to a normal mode of operation).

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

The hearing system may be configured to provide that the current changes to the feedback control unit of the on changes to the current estimate of the feedback path provided by the user are exchanged between first and second hearing aids of a binaural hearing aid system. Alternatively, or additionally, the hearing system may be configured to provide that the one of a number of predefined changes to the feedback signal detected by the respective control units of the first and second hearing aids are exchanged, and that predefined command is executed in one or both hearing aids in dependence of a comparison of the respective detected predefined changes to the feedback signal. A criterion for executing the predefined command may be that the same predefined change to the feedback signal is detected in both of the first and second hearing aids. Alternatively, a criterion for executing the predefined command may be that a predefined combination of different predefined changes to the feedback signal is detected in the first and second hearing aids, respectively.

An APP:

In a further aspect, a non-transitory application, termed an APP, is furthermore provided by the present disclosure. The APP comprises executable instructions configured to be executed on an auxiliary device to implement 'a normal user interface' for a hearing aid or a hearing system described above in the 'detailed description of embodiments', and in the claims. The APP may be configured to run on cellular phone, e.g. a smartphone, or on another portable device allowing communication with said hearing aid or said hearing system.

The APP (and the auxiliary device) may be configured to allow the user to configure the gesture-based user interface according to the present disclosure as described above in the 'detailed description of embodiments', and in the claims. The configuration of durations ($T_A$, $T_R$) of gestures may be user-defined, e.g. via the 'normal user interface' of the hearing aid (i.e. via the APP). Further, the actual movements (gestures) applied to the different 'commands' may be selectable via the APP, e.g. selectable among a number of optional gestures and/or durations.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1:
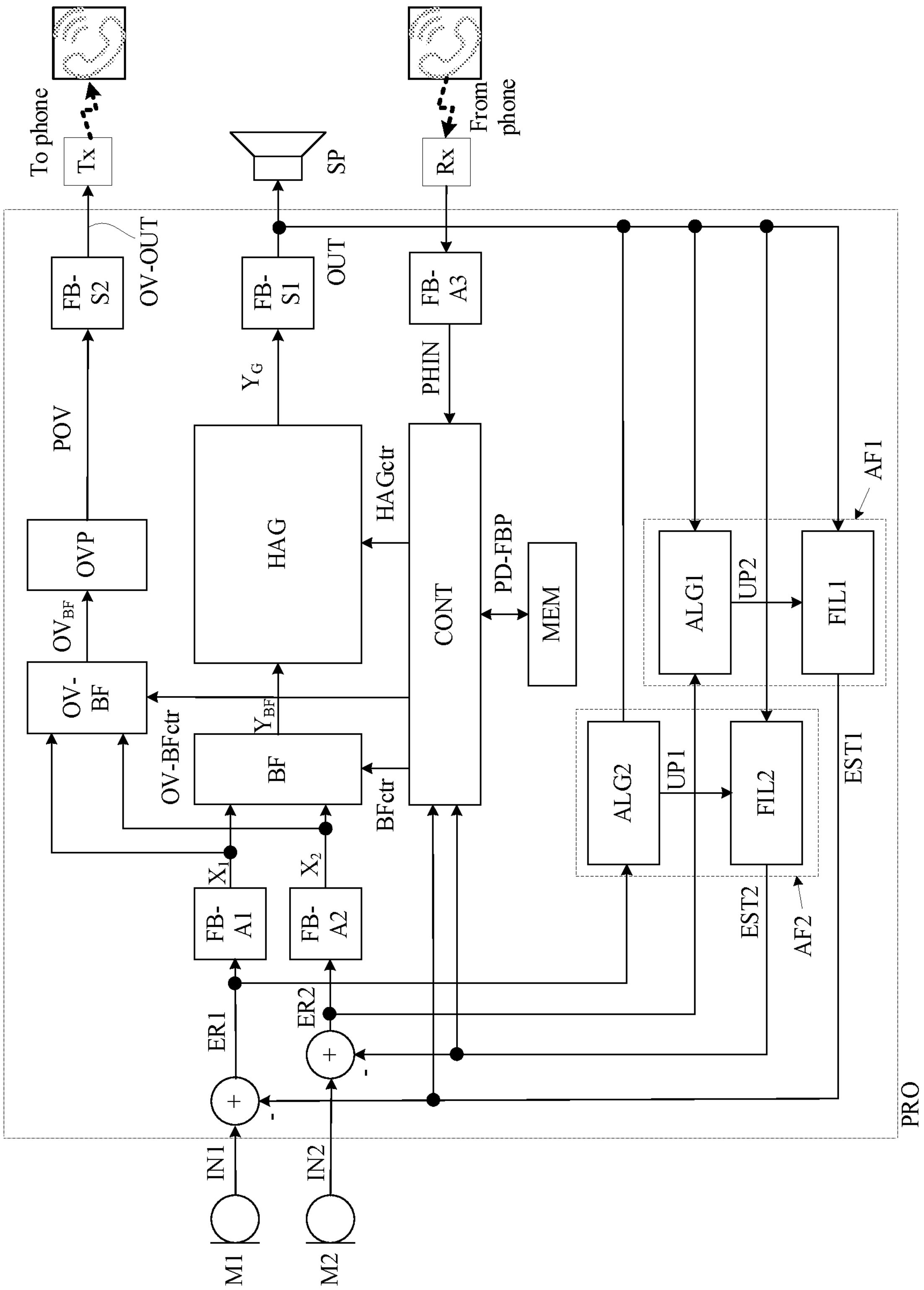
FIG. 1 shows a first embodiment of a hearing aid comprising a gesture-based user interface according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, in particular to a user interface for a hearing aid.

The solution described in the present disclosure makes use of existing dynamic feedback sensor technology in state-of-the-art hearing aids. An exemplary application of the solution may be to enable a truly handsfree experience during telephone call.

The dynamic feedback sensor is capable of detecting an onset of acoustic feedback, e.g. when a human hand is brought physically close to the hearing aid, while it is worn by the user. The feedback manifests via a level change in the feedback signal, e.g. from a low level, when no hand is present near the hearing aid, to a high level, when a hand is moved physically close to the hearing aid. The signal also returns to a low level when the hand is withdrawn from hearing aid.

This change in level presents an opportunity to use dynamic feedback sensor as a proximity sensor for hand movements.

Further, the duration of time a hand remains close to the hearing aid correlates to the duration of the signal at which it remains at a high level.

Hence, the following logic can be established:

- A hand moved close to the hearing aid, held there for a short duration and withdrawn, corresponds to the feedback signal going to a high level for a short duration and returning to its original level. This can be used to interpret the action as an intended input of the user, e.g. "Answer" the phone call, and e.g. used as trigger to initiate an action, e.g. to establish an audio communication path with mobile phone.
- A hand moved close to the hearing aid, held there for a long duration and withdrawn, corresponds to the signal going to a high level for a long duration and returning to its original level. This can be used to interpret the action as an intended input of the user, e.g. "Hang up" or "Reject" the phone call, and e.g. used as trigger to initiate an action, e.g. to disable the audio communication path with mobile phone ("Hang up") (or signal the rejection of the phone call to the mobile phone ("Reject")).

The above procedure can be used to implement a user interface based on hand gestures, e.g. to manage a mobile phone call, as described in further detail in connection with FIG. 2 below:

FIG. 1 shows a first embodiment of a hearing aid comprising a user interface according to the present disclosure.

FIG. 1 schematically illustrates a hearing aid (HA) comprising an input stage a processor (PRO) and an output stage. The hearing aid (HA) comprises a forward path for applying a frequency and level dependent gain to an electric input signal representing sound in the environment around the user wearing the hearing aid. The applied gain is intended to compensate for a hearing impairment of the user. The forward path comprises an input stage comprising a multitude of input transducers (here two), e.g. microphones (M1, M2), for converting sound in the environment to respective electric input signals (IN1, IN2) representing the sound. The forward path further comprises an output stage comprising an output transducer, here a loudspeaker (SP), for converting a processed signal (OUT) to stimuli perceivable by the user as sound (e.g. vibrations in air propagated to an ear canal of the user or vibrations in the body, e.g. bone and flesh). The forward path further comprises a processing part for processing the electric input signals (IN1, IN2) and providing the processed signal (OUT). The hearing aid further comprises a feedback control system configured to estimate a feedback signal representing feedback from the output transducer (SP) to at least one of the input transducers (M1, M2), here to both. The feedback control system may comprise a feedback sensor for repeatedly providing a feedback signal indicative of a current estimate of feedback from an output transducer to an input transducer of the hearing aid. The feedback control system of the embodiment of FIG. 1 comprises respective feedback estimating units for providing respective feedback estimation signals (EST1, EST2) representing the feedback. The feedback estimation unit or units may comprise of constitute the feedback sensor according to the present disclosure. The feedback estimation units may comprise or be constituted by respective adaptive filters (AF1, AF2). Each of the adaptive filters (AF1, AF2) comprises a variable filter (FIL1, FIL2) and an adaptive algorithm (ALG1, ALG2). The adaptive algorithm is configured to adaptively determine updates (UP1, UP2) to filter coefficients of the variable filter (FIL1, FIL2) that minimizes an error signal (ER1, ER2) in view a reference signal (OUT). The output (EST1, EST2) of the variable filter (FIL1, FIL2) may be representative of a feedback signal from the output transducer (SP) to the input transducer (M1, M2), when the input to the variable filter (FIL1, FIL2) is the reference signal (OUT). The reference signal (OUT) may be the processed output signal. The feedback signal may be equal to the output of the variable filter. The error signal (ER1, ER2) may be equal to a difference between the electric input signal (IN1, IN2) and the output (EST1, EST2) of the variable filter (FIL1, FIL2), cf. respective subtraction units ('+') connected to each of the input transducers (M1, M2). The feedback signal (of the feedback sensor according to the present disclosure) may be equal to a processed version of the output (EST1, EST2) of the variable filter FIL1, FIL2).

In addition to the respective subtraction units ('+'), the forward path further comprises respective analysis filter banks (FB-A1, FB-A2) connected to the subtraction units and configured to convert the (digitized, time-domain) output signals (ER1, ER2) of the subtraction units ('+') to a time-frequency representation ($X_1$, $X_2$), where each of the error signals are provided in a frequency sub-band representation (k, l), where k and l are frequency and time indices, respectively, and where k=1, K and K is the number of frequency sub-bands (e.g. equal to the order of a Fourier transform algorithm, e.g. STFT). The forward path further comprises a beamformer (BF) connected to the outputs ($X_1$, $X_2$) of the analysis filter banks (FB-A1, FB-A2) and configured to provide a spatially filtered (beamformed) signal ($Y_{BF}$). The beamformed signal ($Y_{BF}$) is provided as a weighted combination of the electric input signals ($X_1$, $X_2$) based on predefined or adaptively updated filter weights. The beamformer (BF) may e.g. be configured to attenuate noise in the environment of the user, and e.g. enabling a better perception of a target signal, e.g. representing speech of a communication partner in the environment. The forward path further comprises a forward path processing part (HAG) connected to the output ($Y_{BF}$) of the beamformer (BF) and configured to apply one or more processing algorithms to the spatially filtered signal. The one or more processing algorithms may e.g. include one or more of a compressive amplification algorithm and a noise reduction algorithm. The forward path processing part (HAG) provides a processed signal ($Y_G$), which is fed to a synthesis filter bank (FB-S1) for converting the frequency sub-band signals ($Y_G$) to a time-domain signal (OUT). The time-domain signal (OUT) is fed to the output transducer (SP) for presentation to the user's eardrum or skull bone. In a normal mode of operation, the reference signal (OUT) to the adaptive algorithms (ALG1, ALG2), which is identical to the processed (output) signal (OUT) played to the user via the output transducer (SP), is based on the beamformed signal ($Y_{BF}$). In other words, the output signal (OUT) presented to the user is the normal hearing aid signal (i.e. an enhanced environment signal, e.g. focusing on a speaker in the environment, but which also includes a contribution from the user's voice, although not in an optimal form).

The hearing aid further comprises a wireless interface (e.g. comprising an audio interface) to a communication device, e.g. a telephone, e.g. a mobile telephone. The wireless interface may be based on a proprietary or standardized protocol. The proprietary protocol may e.g. be Ultra WideBand (UWB) or similar technology. The standardized protocol may e.g. be Bluetooth or Bluetooth low energy. The wireless interface may be implemented by appropriate antenna and transceiver circuitry (indicated by transmitter (Tx) and receiver (Rx) in FIG. 1). The receiver part (Rx) is e.g. configured to receive a telephone call from a telephone (cf. 'Telephone ringing' symbol with dashed arrow (denoted 'From phone') to the receiver (Rx). The receiver is configured to extract the audio signal of a telephone channel and accompanying control signals and provide these signals (PHIN) (e.g. via an analysis filter bank (FB-A2), as shown in the embodiment of FIG. 1) to a control unit (CONT) of the hearing aid.

The control unit (CONT) is configured to detect when a telephone call is received by the receiver (Rx) (via signal PHIN). The control unit (CONT) is configured to set the hearing aid in a 'call ready' mode wherein it monitors the feedback signal or signals (EST1, EST2) from at least one of the feedback estimation units (AF1, AF2), cf. also FIG. 2 and accompanying description. In the 'call ready' mode, the control unit (CONT) is configured to detect whether or not one of a number of predefined changes to the feedback signal (or signals) (EST1, EST2) (stored in memory (MEM) of the hearing aid) is observed, e.g. within a predefined maximum time from entering the 'call ready' mode. Alternatively, the variable filters (FIL1, FIL2) can be used for the detection. More specifically, the changes to each filter coefficient, as provided by the update signals (UP1, UP2), and/or the variations in the frequency responses of the filters (FIL1, FIL2) would provide the same kind of information as the detection from feedback estimates (EST1, EST2).

Detection of one of a number of (e.g. frequency dependent) predefined changes to the feedback signal (or signals) may be provided by storing the feedback signal when the incoming call is detected (just before entering the 'call ready' mode), determining a possible change to the feedback signal occurring after entering the 'call ready' mode (but within the predefined maximum time) by comparing (e.g. subtracting) the current feedback signal with the feedback signal stored just before entering the 'call ready' mode. The control unit (CONT) is configured to compare the observed change in the feedback signal with the number of predefined changes to the feedback signal stored in memory (MEM) of the hearing aid. Each of the predefined changes to the feedback signal stored in memory (MEM) may e.g. be induced by certain (associated) gestures of the user, e.g. hand movements (cf. e.g. description in connection with step 4 of the flow diagram in FIG. 2). Each of the predefined changes to the feedback signal may further be associated with a specific command, e.g. 'accept call', 'reject call', 'terminate call', etc. If a change to the feedback signal occurring after entering the 'call ready' mode is identified by the control unit (CONT) as one of the predefined changes to the feedback signal stored in memory (MEM) (cf. signal PD-FBP), the command associated with the predefined change is executed by the hearing aid, cf. e.g. signals (BFctr, OV-BFctr, HAGctr) from the control unit (CONT) to the beamformers (BF, OV-BF) and to the forward path processing part (HAG).

In case a call is accepted, the control unit (CONT) is configured to enter the 'call mode' and route the incoming audio signal (PHIN) from the receiver (Rx), e.g. comprising audio from a far-end communication partner or audio from a one way audio delivery device, to the output transducer (SP) of the hearing aid via the forward path processing part (HAG). The incoming audio signal (PHIN) may e.g. be mixed with the (possibly attenuated) beamformed signal ($Y_{BF}$) from the environment, and possibly subjected to processing algorithms of the hearing aid (e.g. to compensate for a user's hearing impairment) before being presented to the user via the output transducer (SP).

In case the accepted call is a normal two-way telephone call, the control unit (CONT) (being in 'call mode') is further configured to activate the own voice pick-up path (cf. top signal path of FIG. 2) from the output of the analysis filter banks (FB-A1, FB-A2) to the transmitter (Tx) for transmission to the far-end communication partner via the transmitter (Tx) (cf. dashed arrow (denoted 'To phone') from the transmitter (Tx) to the 'Telephone ringing' symbol). The own voice pick-up path comprises an own voice beamformer (OV-BF) for spatially filtering the electric input signals ($X_1$, $X_2$) representing sound from the environment of the user. The own voice beamformer (OV-BF) is configured to provide a spatially filtered (beamformed) own voice signal ($OV_{BF}$) wherein the user's voice is maintained while other sounds in the environment are attenuated. The own voice signal ($OV_{BF}$) is provided as a weighted combination of the electric input signals ($X_1$, $X_2$) based on predefined or adaptively updated filter weights. The own voice signal ($OV_{BF}$) is fed to an own voice processing part, e.g. to further reduce noise in the own voice signal ($OV_{BF}$), providing processed own voice signal (POV). The processed own voice signal (POV) is fed to a synthesis filter bank (FB-S2) for converting the frequency sub-band signals (POV) to a time-domain signal (OV-OUT) comprising the user's own voice, which is fed to the transmitter (Tx) for transmission to the far-end recipient (e.g. via the user's telephone and a telephone and/or data network).

In case the call is rejected, the control unit (CONT) is configured to leave the 'call ready' mode and return to 'normal mode' (e.g. the mode that the hearing aid was in when the 'call ready' mode was entered).

In case the remote communication partner terminates the telephone call, the control unit will receive or extract a 'call ended' message from the signal (PHIN) received from the user's telephone via the wireless receiver (Rx) of the hearing aid. The control unit (CONT) is configured to leave the 'call mode' and return to 'normal mode' (e.g. the mode that the hearing aid was in when the 'call ready' mode was entered).

In case the user wants to terminate the telephone call, this may be done via a (normal) user interface on the telephone. Alternatively, of additionally, the control unit may be configured to detect a specific change in the feedback signal associated with the action 'terminate call'. This may e.g. be implemented by arranging that the control unit (CONT) is configured to detect whether or not the specific change to the feedback signal (or signals) (EST1, EST2) (stored in memory (MEM) of the hearing aid) is observed. The specific change in feedback may be induced by a specific hand gesture that creates a large or otherwise easy to detect change in the feedback signal (e.g. a repeated variation between a large and small change of the feedback signal, which if not induced by a hand gesture of the user would be highly improbable to occur). When this specific change in the feedback signal is detected, the control unit (CONT) is configured to leave the 'call mode' and return to 'normal mode' (e.g. the mode that the hearing aid was in when the 'call ready' mode was entered).

Steps in the management of a telephone call via a user interface according to the present disclosure is exemplified below (where 'HI' is short for 'hearing instrument' intended to be synonymous with the term 'hearing aid'):

- HI is connected to a mobile phone via Bluetooth;
- An incoming call notification on the phone is routed to HI and a ring tone (or a similar prompt) is played on HI;
- The HI goes into "Incoming Call" mode preparing to either answer or reject the call;
- The user can choose one of the two actions (answer, reject):
  - The user can answer the call by moving his hand close to the HI (or one of the HIs), hold it there for a short duration ($\Delta T_A$), and then withdraw it;
  - The user can reject the call by moving his hand close to the HI, hold it there for a long duration ($\Delta T_R > \Delta T_A$)), and then withdraw it;
  - (The gestures may, in principle, be configured 'the other way around', so that $\Delta T_A > \Delta T_R$);
  - If the user choses to "Answer" the call, then the HI goes into "In Call" mode;
  - At the end of the call, the user can "Hang up" the call by moving his hand close to HI, hold there for a long duration ($\Delta T_H \geq \Delta T_R$) and withdraw it.
  - (again, this gesture may in principle be of any duration, short/long/very long, as we are only waiting for "Hang up" at this stage);
- The change in signal level and duration can be used to trigger further actions such as to set up a 1-way or 2-way audio path to the mobile phone or to disable the path at the end of call.

The actual configuration of durations ($T_A$, $T_R$) may also be user-defined (use either the long or short movements for accept/reject), e.g. during fitting, or via a normal user interface of the HI, e.g. via an APP. Further, the actual movements (gestures) applied to the different 'commands' may be selectable via a normal user interface of the HI, e.g. among a number of optional gestures and/or durations.

In addition to the above mentioned 'answer call', 'reject call' and 'hang up' (i.e. 'terminate call'), other commands related to the telephone call may be introduced via the user interface according to the present disclosure. As an example, a "pause/muted" feature, providing a pause in the connection between the hearing aid and the user's telephone, can be introduced (e.g. to allow a user to do other things without being connected to a far-end communication partner).

This task of translating the changes in the feedback signal and its duration may be handled by the signal processor of the hearing aid. The feedback signal may e.g. be the estimation signal provided by a feedback estimation system the hearing aid (e.g. typically provided by an adaptive filter comprising a variable filter whose filter coefficients are adaptively updated by an adaptive algorithm e.g. an LMS algorithm or an NLMS algorithm, etc.

Hence, the (alternative) user interface according to the present disclosure may be implemented using functional parts that are already present in a state-of-the-art hearing aid (digital signal processing and feedback path estimation).

The above procedure is illustrated in the flow diagram of FIG. 2 and further described below.

Figure 2:
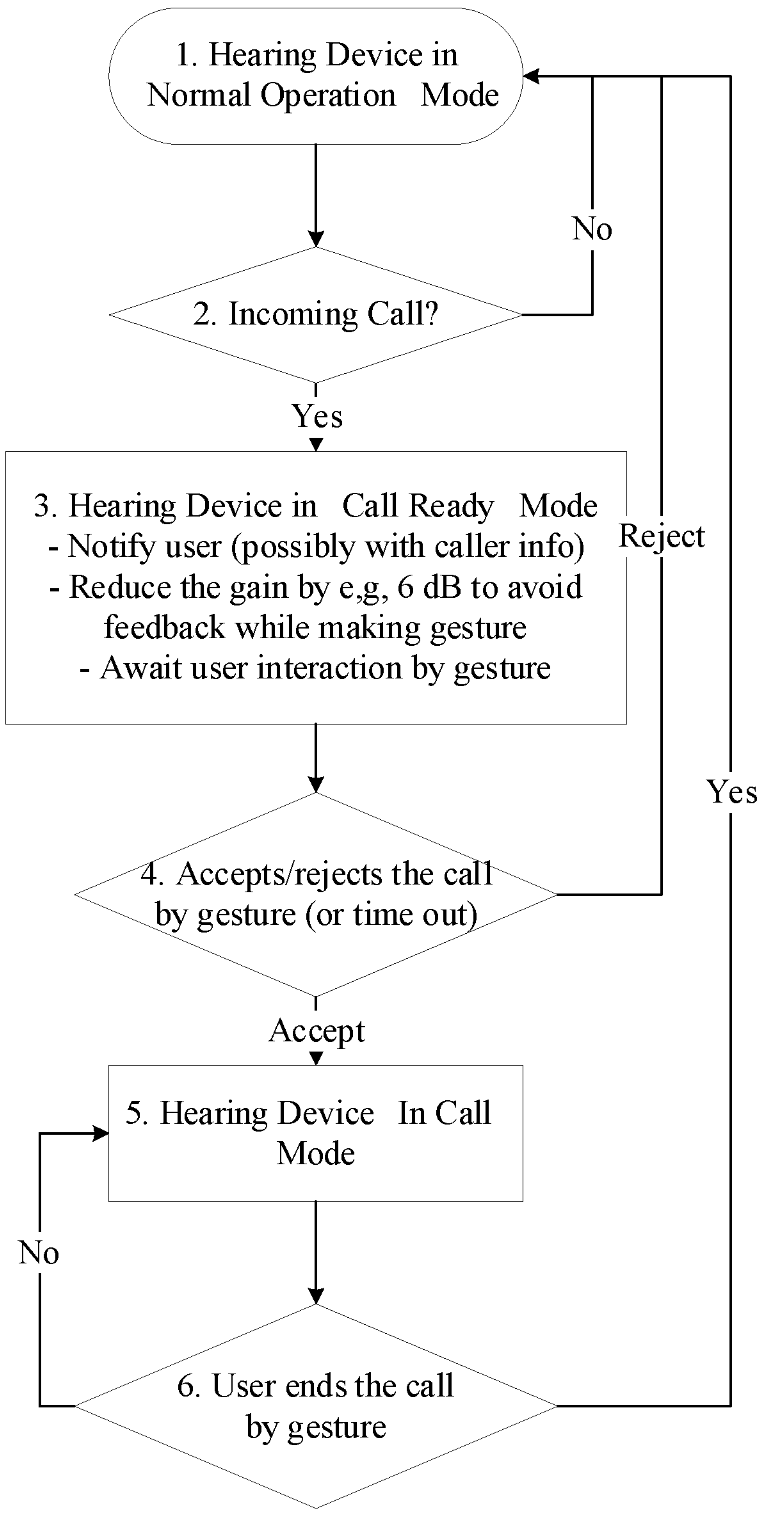
FIG. 2 shows a flowchart for an embodiment of a method of operating a hearing aid in connection with a telephone call.

FIG. 2 shows a flowchart for an embodiment of a method of operating a hearing aid in connection with a telephone call.

State 1: The hearing device is in its "normal operation" mode.

State 2: If there is an incoming call (directly to the hearing device, or through a phone that is connected to the hearing device via Bluetooth or other connections), the hearing device changes its operation mode to "Call Ready" mode (arrow 'Yes' leading to state 3). Otherwise, stay in it "normal operation" mode (arrow 'No' leading to state 1).

State 3: The hearing device is in the "Call Ready" mode. More specifically,

- The hearing device sends a notification to the user; this may be one or more notification tones, voices, and/or with caller information (such as names, phone numbers read out for the user) played through its output (receiver/speaker in the hearing aids, and vibrator in the case of a bone conducting hearing aid device).
- The hearing device may be configured to reduce its amplification by e.g. 6 dB in certain frequency regions in this mode to avoid any possible user gesture would lead to (critical) acoustic feedback to occur (e.g. howl).
- The system is waiting for hand gestures from the user. The estimated feedback path change from the feedback system will be monitored and used to determine the gestures. Particularly, this can be done by monitoring the frequency response of the estimated feedback path, e.g. in the frequency range between 2-5 kHz. If the magnitude exceeds a certain value within a time window, e.g., by 3 dB over a 0.2-1 second period, a gesture can be declared. As an alternative to the feedback path estimate, the open loop transfer function can also be used for the gesture detection. An open loop transfer function estimation can be done without having any adaptive filters as part of a feedback cancellation system. The magnitude/phase of the open loop transfer function (OLM/OLP) can be determined as:

$OLM=L(\omega,n)-L(\omega,n-D)$, $OLP=P(\omega,n)-P(\omega,n-D)$, where L is the signal level (in dB), P is the signal phase (both for a signal at any point in the acoustic signal loop), ω is the frequency index, n is the discrete time index, and D is the loop delay in samples. The loop delay is the time needed for a signal to travel through an electric and acoustic loop (e.g. starting from the acoustic input to an input transducer (e.g. a microphone) of the hearing device through the electric forward path to the output of the output transducer (e.g. a loudspeaker) and further via an acoustic feedback path from the output of the output transducer to the input of the input transducer).

State 4: When a valid gesture has been registered, the user can accept or reject the call; the hearing device is set to either "in call" mode (arrow 'Accept' leading to state 5) or back to "normal operation" mode (arrow 'Reject' leading to 'state 1'). More specifically, To accept the call, the gesture "Hand moved close to HI, held there for a short duration and withdrawn" may e.g. be decided. 'A short duration' may typically be 0.5-1 s, but can also be 0.2 s, or up to 2 s. Shorter duration would make the gesture detection unreliable, and longer time could then be treated as "long duration" to reject the call. To reject the call, the gesture "Hand moved close to HI, held there for a long duration and withdrawn" may e.g. be decided. 'A short duration' may typically be longer than 2-3 seconds (at least longer than the time for 'a short duration'.

(In principle, the long/short duration can be defined by user to accept/reject calls).

Instead of or in addition to the short/long duration, the gestures can also be "left and right hand gesture", e.g., by moving the hand to the left hearing device means "accept" and moving the hand to the right hearing device means "reject".

Different distances from the hand to the hearing aid can also be used to indicate "accept" or "reject". E.g., a hand approximately 10 cm away means "reject", whereas a hand approximately 3 cm means "accept".

Different repetitions of hand movements can also be used to indicate accept/reject calls. E.g., the hand quickly move towards/away from the hearing device means "accept", while two repeated such movements quickly after each other means "reject".

A combination of the above mentioned may also be used, e.g., on the left-hand side, a short/long duration means accept/reject, respectively, whereas on the right-hand side, a short/long duration means the opposite, i.e., reject/accept, respectively. In this way, it is possible to always use one hand or the short/long duration to accept/reject calls.

In case that no valid gesture is detected, a predefined action (e.g. 'reject call', or 'accept call') may be performed.

State 5: The hearing device is in the "In call" mode.

State 6: The hearing aid ends the call, if a "hang up" gesture has been registered (arrow 'Yes' leading to state 1). If no "hang up" gesture is detected the hearing aid remains in state 5 (arrow 'No' leading to state 5). The "hang up" gesture can be any of the abovementioned gestures or a specific hang up-gesture different from the gestures decided for 'accept' and 'reject'. In case the hang up-signal comes from the far-end, the control unit (CONT) unit (cf. e.g. FIG. 1 or 3) may be configured to directs the hearing aid back to state 1.

Figure 3:
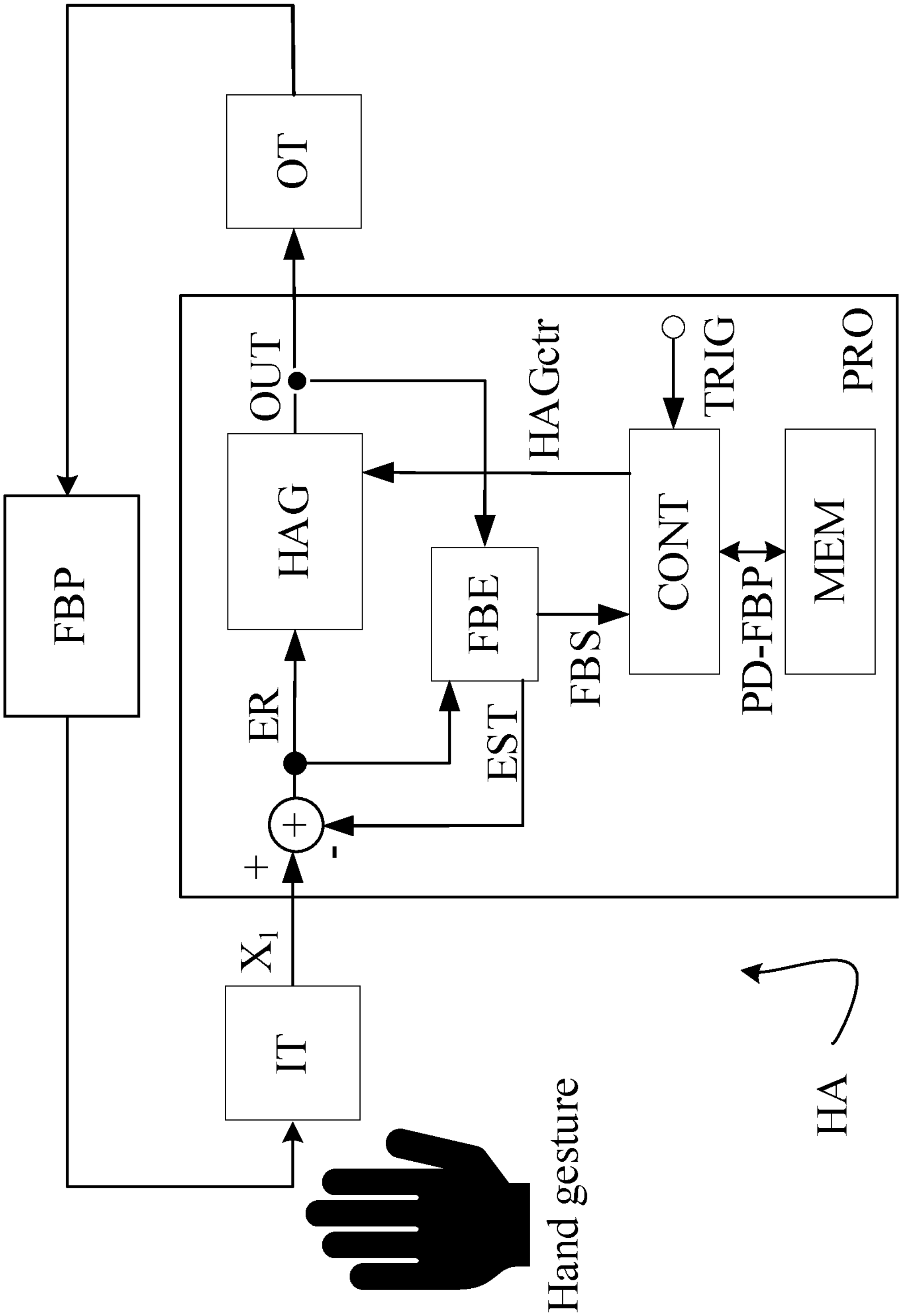
FIG. 3 shows a second embodiment of a hearing aid comprising a gesture-based user interface according to the present disclosure.

FIG. 3 schematically illustrates a hearing aid (HA) comprising an input stage a processor (PRO) and an output stage. The processor may e.g. be a digital signal processor handling processing of the hearing aid in the digital domain. FIG. 3 shows an embodiment of a hearing aid comprising a user interface according to the present disclosure. FIG. 3 schematically illustrates a hearing aid (HA) configured to be worn by a user. The hearing aid (HA) comprises a forward path comprising an input transducer (IT), a forward-path-processing-part (HAG), and an output transducer (OT). The forward path is configured to apply a frequency and level dependent gain (provided by a forward-path-processing-part (HAG)) to an electric input signal representing sound in the environment around the user wearing the hearing aid and to present a processed version of the sound to the user wearing the hearing aid. The applied gain provided by the forward-path-processing-part (HAG) may be intended to compensate for a hearing impairment of the user. The hearing aid comprises a (gesture based) user interface allowing the user to control functionality of the hearing aid. The hearing aid further comprises a feedback sensor (FBE) for repeatedly providing a feedback signal (FBS) indicative of a current estimate of feedback from an output transducer (OT) to an input transducer (IT) of the hearing aid. The gesture-based user interface is based on changes to the current estimate of the feedback path (FBP) provided by the user (Hand gesture). The hearing aid (HA) further comprises a control unit (CONT). The control unit (CONT) is configured to detect a trigger input (TRIG). The control unit (CONT) is configured to set the hearing aid in a 'command input' mode wherein it monitors the feedback signal (FBS) from the feedback estimation unit (FBE). In the 'command input' mode, the control unit (CONT) is configured to detect whether or not one of a number of predefined changes to the feedback signal (FBS) (stored in memory (MEM) of the hearing aid) is observed, e.g. within a predefined maximum time from entering the 'command' mode. Detection of one of a number of (e.g. frequency dependent) predefined changes to the feedback signal (or signals) may be provided by storing the feedback signal when the trigger input is detected. Detection of one of a number of (e.g. frequency dependent) predefined changes to the feedback signal (or signals) may be provided by storing the feedback signal when the incoming call is detected and determining a possible change to the feedback signal (FBS) occurring after entering the 'command' mode (but e.g. within the predefined maximum time) by comparing the current feedback signal with the feedback signal stored just before entering the 'command' mode (e.g. by subtracting stored feedback signal from the current feedback signal). The control unit (CONT) is configured to compare the observed change in the feedback signal with the number of predefined changes to the feedback signal stored in memory (MEM) of the hearing aid. Each of the predefined changes to the feedback signal stored in memory (MEM) may e.g. be induced by certain (associated) gestures of the user, e.g. hand movements (cf. e.g. description in connection with step 4 of the flow diagram in FIG. 2). Each of the predefined changes to the feedback signal may further be associated with a specific command for controlling the hearing aid. Examples may e.g. be 'volume up', 'volume down', 'listen to audio input' 'accept phone call', 'reject phone call', 'terminate phone call', 'initiate priority phone call', 'change of program', 'change of profile (with different settings of e.g. directionality)', etc. If a change to the feedback signal occurring after entering the 'command' mode is identified by the control unit (CONT) as one of the predefined changes to the feedback signal stored in memory (MEM) (cf. signal PD-FBP between the control unit (CONT) and the memory (MEM)), the command associated with the predefined change is executed by the hearing aid, cf. e.g. signal (HAGctr) from the control unit (CONT) to the forward path processing part (HAG).

A 'trigger input may' e.g. be a telephone call (cf. e.g. signal PHIN in FIG. 1), or any other input from another electronic device, e.g. a communication device, e.g. requiring some sort of acceptance or rejection from the user.

In principle, all user interactions that would be possible with mechanical buttons, physical touching, or changes via a touch screen of an APP can be activated as these 'gesture based' commands according to the present disclosure.

The 'gesture based' user interface may be used as a confirmation of a command entered via a normal (e.g. APP-based) user interface, e.g. in case the command in question is especially important, e.g. providing access to an account, or device, e.g. a car. Thereby it may be ensured that the command from the normal user interface is issued by the hearing aid user.

Embodiments of the disclosure may e.g. be useful in applications such as hearing aids or headsets, or a combination thereof.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure.

The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

The invention claimed is:

1. A hearing aid configured to be worn by a user, the hearing aid comprising an input transducer for picking up sound from an environment around the user when wearing the hearing aid and providing an electric input signal representing said environment sound;

a processor for processing said electric input signal, including to apply a frequency and level dependent amplification to said electric input signal, or a signal originating therefrom, and providing a processed output signal; and an output transducer for converting said processed output signal to stimuli perceivable by the user as sound;

a user interface allowing the user to control functionality of the hearing aid; and a feedback sensor for repeatedly providing a feedback signal indicative of a current estimate of feedback from an output transducer to an input transducer of the hearing aid, wherein the user interface is based on changes to the current estimate of the feedback path provided by the user, wherein the processor comprises a control unit configured to enter a command mode when a specific trigger signal is received, wherein the control unit is configured to detect one of a number of predefined changes to the feedback signal when said command mode is entered, and wherein each of said number of predefined changes to the feedback signal is associated with a specific command for controlling the hearing aid, wherein the specific trigger signal is a signal from a communication device indicating the presence of a telephone call, requiring acceptance or rejection from the user, and wherein the control unit is configured to reduce said amplification, when said command mode is entered.

2. The hearing aid according to claim 1 wherein the control unit is configured to reduce said amplification by a predefined amount or factor.

3. The hearing aid according to claim 1 wherein the control unit is configured to reduce said amplification by a predefined amount or factor in dependence of said trigger signal.

4. The hearing aid according to claim 1 wherein said feedback sensor comprises an adaptive filter for providing said feedback signal.

5. The hearing aid according to claim 4, wherein the feedback signal is based on a frequency response of an estimated feedback path from said output transducer to said input transducer, and wherein the control unit is configured to monitor the frequency response of the estimated feedback path in a limited frequency range.

6. The hearing aid according to claim 4, wherein the feedback signal is based on a frequency response of an estimated feedback path from said output transducer to said input transducer, wherein a magnitude of the predefined changes is above a threshold.

7. The hearing aid according to claim 1 comprising memory (MEM) wherein said number of predefined changes to the feedback signal are stored.

8. The hearing aid according to claim 7 wherein each of said predefined changes to the feedback signal is associated with a specific command for controlling the hearing aid.

9. The hearing aid according to claim 8 configured to execute the command associated with a detected change to the feedback signal.

10. The hearing aid according to claim 1 wherein the feedback signal is based on a frequency response of an estimated feedback path from said output transducer to said input transducer.

11. The hearing aid according to claim 1 wherein the control unit is configured to reduce its amplification in certain frequency regions.

12. The hearing aid according to claim 1 wherein said trigger signal is related to the reception of a telephone call.

13. The hearing aid according to claim 1 being constituted by or comprising an air-conduction type hearing aid or a bone-conduction type hearing aid, or a combination thereof.

14. A method of operating a hearing aid configured to be worn by a user, the hearing aid comprising a user interface allowing the user to control functionality of the hearing aid, the hearing aid comprising an input transducer for picking up sound from an environment around the user when wearing the hearing aid and providing an electric input signal representing said environment sound;

a processor for processing said electric input signal, including to apply a frequency and level dependent amplification said electric input signal, or a signal originating therefrom, and providing a processed output signal; and an output transducer for converting said processed output signal to stimuli perceivable by the user as sound;

the method comprising repeatedly providing a feedback signal indicative of a current estimate of feedback from an output transducer to an input transducer of the hearing aid, providing said user interface based on changes to said current estimate of the feedback path provided by the user, entering a command mode when a specific trigger signal is received, and detecting one of a number of predefined changes to the feedback signal when said command mode is entered, wherein each of said number of predefined changes to the feedback signal is associated with a specific command for controlling the hearing aid, wherein the specific trigger signal is a signal from a communication device indicating the presence of a telephone call, requiring acceptance or rejection from the user, and wherein the processor reduces amplification when said command mode is entered.

15. The method according to claim 14 wherein said changes to the current estimate of the feedback path are provided by user gestures.

16. The method according to claim 14 comprising: providing said reduction of amplification by a predefined amount or factor.

17. The method according to claim 14 comprising: providing said reduction of amplification by 3 dB or more, or by 6 dB or more.

18. The method according to claim 14 comprising: providing said reduction of amplification in one or more frequency regions, where feedback is most likely to occur.

19. A method of operating a hearing aid configured to be worn by a user, the hearing aid comprising a user interface allowing the user to control functionality of the hearing aid, the hearing aid comprising an input transducer for picking up sound from an environment around the user when wearing the hearing aid and providing an electric input signal representing said environment sound;

a processor for processing said electric input signal, including to apply a frequency and level dependent amplification said electric input signal, or a signal originating therefrom, and providing a processed output signal; and an output transducer for converting said processed output signal to stimuli perceivable by the user as sound;

the method comprising repeatedly providing a feedback signal indicative of a current estimate of feedback from an output transducer to an input transducer of the hearing aid, providing said user interface based on changes to said current estimate of the feedback path, entering a command mode when a specific trigger signal is received, detecting one of a number of predefined changes to the feedback signal when said command mode is entered, and wherein each of said number of predefined changes to the feedback signal is associated with a specific command for controlling the hearing aid providing a reduction of said amplification of a signal of an audio path from said input transducer to said output transducer, when said command mode is entered, and providing said reduction of amplification in a frequency range between 2 kHz and 5 kHz.

20. A method of operating a hearing aid configured to be worn by a user, the hearing aid comprising a user interface allowing the user to control functionality of the hearing aid, the hearing aid comprising an input transducer for picking up sound from an environment around the user when wearing the hearing aid and providing an electric input signal representing said environment sound;

a processor for processing said electric input signal, including to apply a frequency and level dependent amplification said electric input signal, or a signal originating therefrom, and providing a processed output signal; and an output transducer for converting said processed output signal to stimuli perceivable by the user as sound;

the method comprising repeatedly providing a feedback signal indicative of a current estimate of feedback from an output transducer to an input transducer of the hearing aid, providing said user interface based on changes to said current estimate of the feedback path, entering a command mode when a specific trigger signal is received, detecting one of a number of predefined changes to the feedback signal when said command mode is entered, and wherein each of said number of predefined changes to the feedback signal is associated with a specific command for controlling the hearing aid, and terminating the command mode in case no hand gesture has been detected within a predefined time.

* * * * *